(12) United States Patent
May

(10) Patent No.: US 6,810,754 B2
(45) Date of Patent: Nov. 2, 2004

(54) MAGNETIC-BASED TRANSDUCER FOR MEASURING DISPLACEMENT

(75) Inventor: Lutz Axel May, Gelting (DE)

(73) Assignee: Abas, Incorporated, Chicago, IL (US)

( * ) Notice: Subject to any disclaimer, the term of this patent is extended or adjusted under 35 U.S.C. 154(b) by 0 days.

(21) Appl. No.: 10/373,634

(22) Filed: Feb. 24, 2003

(65) Prior Publication Data
US 2004/0035221 A1 Feb. 26, 2004

(51) Int. Cl.[7] .............................................. G01L 3/02
(52) U.S. Cl. ................................................. 73/862.333
(58) Field of Search ...................... 73/862.331, 862.332, 73/862.333

(56) References Cited

U.S. PATENT DOCUMENTS

| | | | | |
|---|---|---|---|---|
| 4,578,642 A | * | 3/1986 | Moake et al. ............... | 324/160 |
| 4,803,885 A | * | 2/1989 | Nonomura et al. .... | 73/862.333 |
| 5,165,286 A | * | 11/1992 | Hamamura et al. ........... | 73/779 |
| 5,351,555 A | | 10/1994 | Garshelis ..................... | 73/862 |

FOREIGN PATENT DOCUMENTS

| | | |
|---|---|---|
| EP | 0 321 662 B1 | 2/1994 |
| WO | WO 99/56099 | 11/1999 |
| WO | WO 01/13081 A1 | 2/2001 |
| WO | WO 01/79801 A2 | 10/2001 |
| WO | WO 01/79801 A3 | 10/2001 |

* cited by examiner

Primary Examiner—Max Noori
(74) Attorney, Agent, or Firm—Blank Rome LLP

(57) ABSTRACT

A transducer for measuring displacement comprises a transducer assembly in which there is a coil wound about an axis and energisable to generate a magnetic field, and first and second magnetic field sensor devices, that are axially spaced with the coil therebetween, each device being in proximity to the coil to respond to a magnetic field component generated by energisation of the coil. A ferromagnetic member is disposed to interact with the field generated by the coil, the ferromagnetic member and the transducer assembly being mounted for relative displacement in the direction of said axis, such that the balance of the respective field components sensed by the first and second sensor devices is a function of the axial position of the ferromagnetic member relative to the transducer assembly.

21 Claims, 8 Drawing Sheets

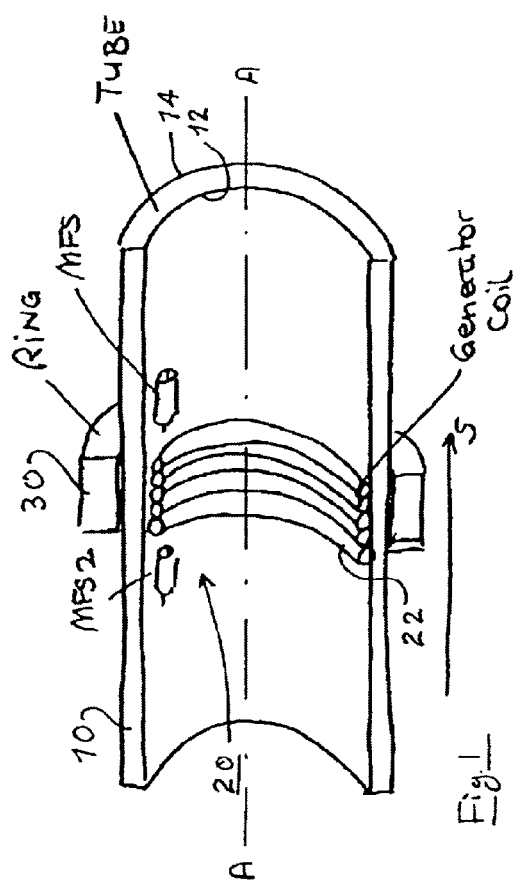

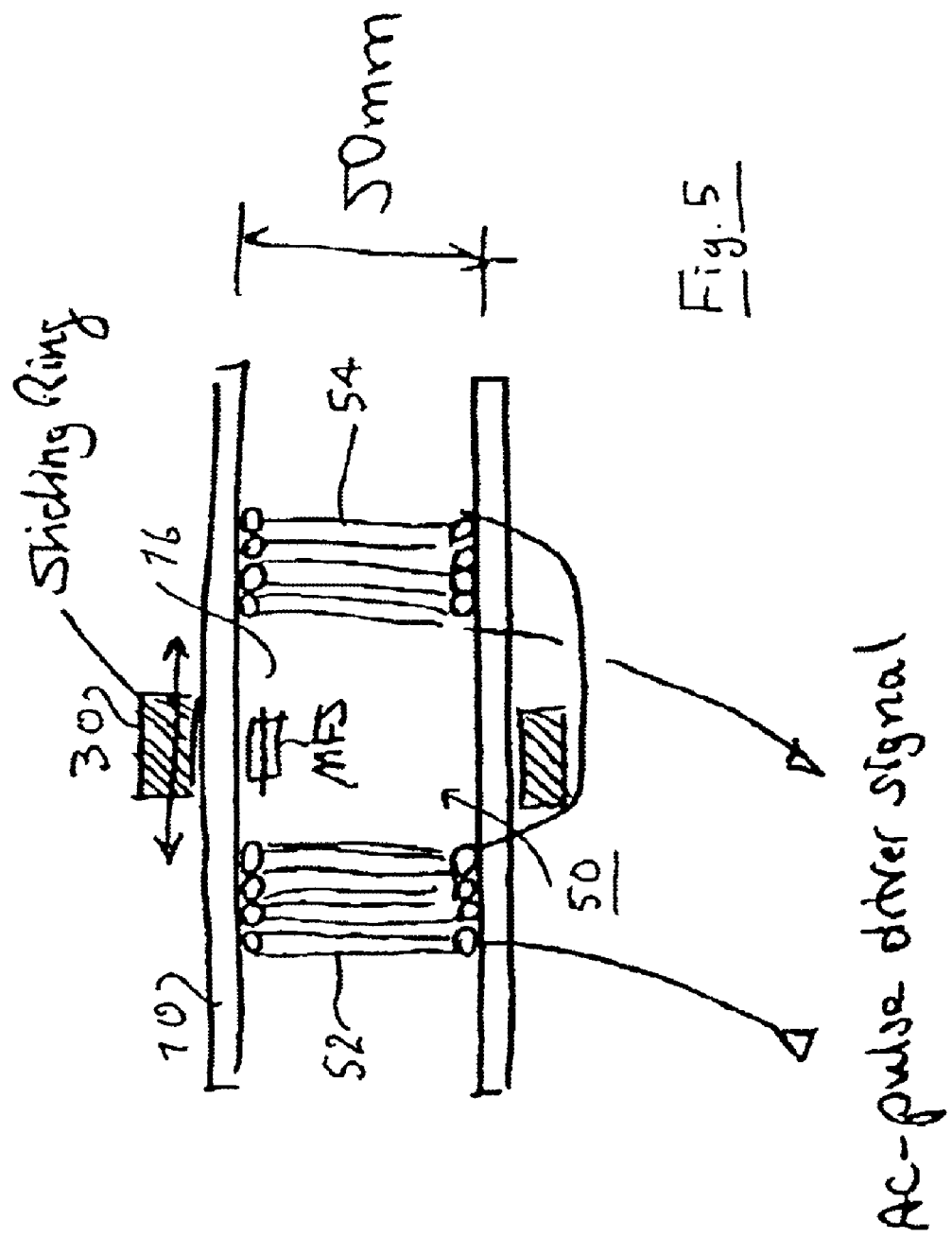

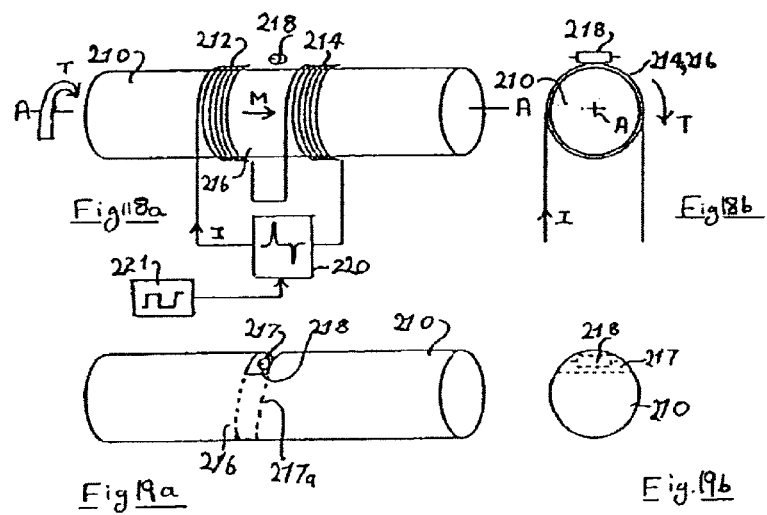
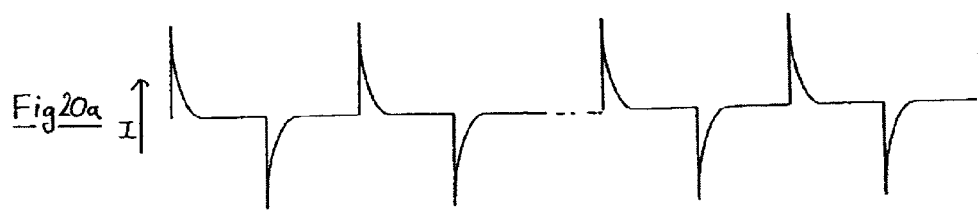
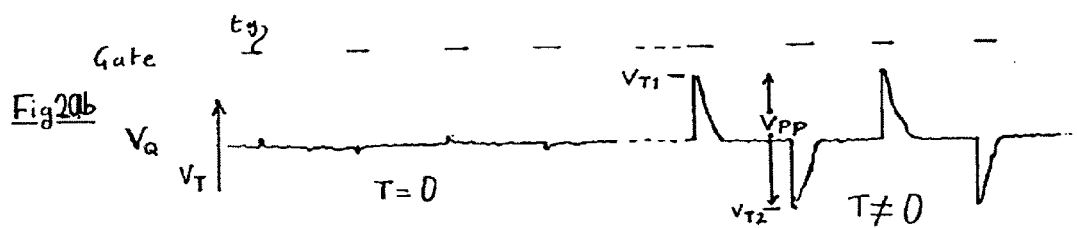

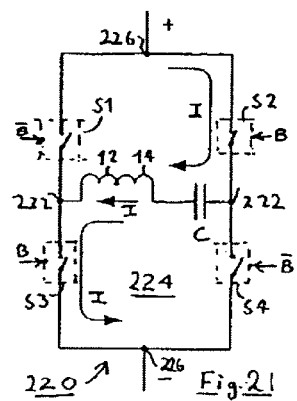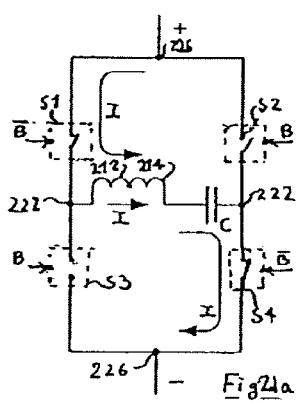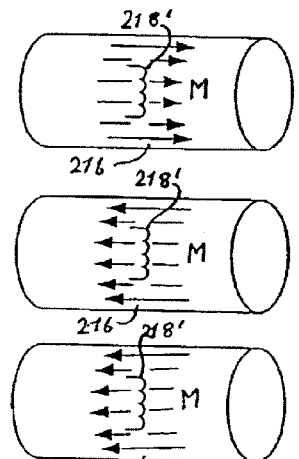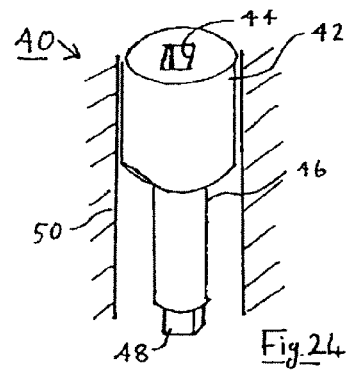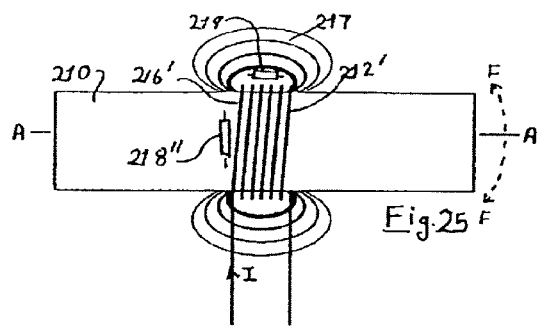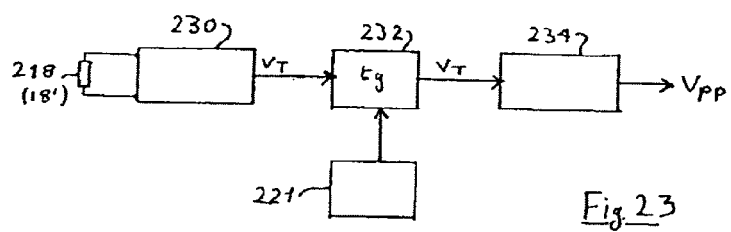

MAGNETIC-BASED TRANSDUCER FOR MEASURING DISPLACEMENT

FIELD OF THE INVENTION

This invention relates to a magnetic-based transducer for measuring a displacement, particularly a linear displacement or position measurement. The invention still further relates to a transducer assembly, in particular a magnetic-based transducer and transducer assembly.

BACKGROUND TO THE INVENTION

Magnetic transducer technology has gained wide acceptance for measuring torque in shafts or other parts for transmitting torque. Magnetic-based torque transducers have found application in non-contacting torque sensors particularly for a shaft which rotates about its longitudinal axis. One or more magnetic regions, used as one or more transducer elements, are created in or on the shaft to emanate a torque-dependent magnetic field component external to the shaft which is detected by a sensor arrangement that is not in contact with the shaft.

The principles used in measuring torque or force may also be adapted to measuring displacement. The following description will be given in the context of shafts but will be understood to apply to measuring displacement in parts in general, unless the context otherwise requires.

One class of magnetic region used as a transducer element in magnetic transducers is self-excited in that it is a region of permanent or stored magnetisation which emanates an external field. The transducer region is sometimes referred to as "encoded" in that a predetermined configuration of magnetisation is stored in it.

A transducer element may be created in a region of stored or permanent (remanent) magnetisation in a ferromagnetic integral region of the shaft or part. Transducer elements of this kind are disclosed in published PCT applications WO99/56099, WO01/13081 and WO01/79801. The stored magnetisation may be of the kind known as circumferential in an integral region of a ferromagnetic shaft as disclosed in WO99/56099 or it may be a circumferentially-magnetised ring secured to the shaft as disclosed in U.S. Pat. No. 5,351,555. Another form of stored magnetisation is an integral portion of a shaft in which the stored magnetisation is in an annulus about the axis of the shaft and is directed longitudinally, that is in the direction of the shaft axis. One kind of longitudinal magnetisation is known as circumferential (tangential)-sensing longitudinal magnetisation and is disclosed in WO01/13081; another kind is known as profile-shift longitudinal magnetisation as disclosed in WO01/79801.

All these forms of transducer magnetisation are "D.C." magnetisations in the sense they operate with unipolar magnetic fluxes generated by the remanent magnetism stored in permanent magnets.

The sensor devices used with self-excited transducer elements may be of the Hall effect, magnetoresistive or saturating core type. These sensor-devices are sensitive to orientation. They have an axis of maximum response, and an orthogonal axis of minimum response.

Another class of magnetic transducer region is externally excited by an energised coil wound about the region. One form of externally-excited transducer is the transformer type in which the region couples an excitation winding to a detector winding. For example the permeability of the transducer element may be torque dependent. The transformer-type of transducer is A.C. energised. An example of a transformer-type of transducer is disclosed in EP-A-0321662 in which the transducer regions are specially prepared to have a desired magnetic anisotrophy at the surface.

The measurement may need to be done in circumstances where there are interference magnetic fields of a largely unknown and unpredictable type. Such fields are likely to arise in production plants and such like environments. Magnetic field interference can arise from unipolar fields, noise spikes and "A.C." fields at the local powerline frequency, among others.

Another form of externally-excited transducer element is disclosed in WO01/27584 in which the magnetisation of a region of a shaft arises from energisation of one or more coils are mounted coaxially with a shaft in which an applied torque is to be measured. The coils are axially spaced and define a transducer region therebetween. The coils are connected in series to generate magnetic fields in the same direction in the transducer region between the coils. The coils are energised to induce a longitudinal magnetic field of a given polarity. The longitudinal field in the transducer region is deflected in direction and to an extent dependent on torque applied to the shaft to produce an external circumferential (tangential) magnetic field component that is a function of torque. The axially-directed component of the field is separately detected to provide a reference against which the circumferential component is measured. If the coils are D.C. energised the resultant magnetic field may be interfered with by other local fields, e.g. fields extending along the shaft whose torque is to be measured.

In the torque measurement system disclosed in WO01/27584, the pair of spaced coils is A.C. energised at a frequency selected to be distinguishable from noise frequencies, e.g. mains power frequency, and the sensor output is also detected in a frequency-selective manner. The torque-dependent "A.C." or alternating polarity (AP) magnetic field component is detected. By using A.C energisation interfering D.C. fields can be discriminated against and the A.C. frequency can be selected to discriminate against interference as the local power line or supply frequency, e.g. 50 or 60 Hz. The detection may be synchronous with the A.C. energisation. The external field to be sensed is enhanced by a pair of spaced collars of magnetic material attached to the transducer region to aid the establishing in a recess between the collars of an external component of the longitudinal field in the transducer region. A sensor arrangement responsive to a torque-dependent magnetic field in the circumferential (tangential) arrangement is disposed in the recess.

The just-described transducer has the advantage that the transducer region does not have to be encoded with a stored magnetisation. Nonetheless a transducer region has to be defined between a pair of spaced coils.

The prior art also discloses various magnetic field sensor arrangements using two or more sensor devices to compensate for potential measurement errors and to assist in nullifying the effects of interfering fields. Although small, such sensor arrangements may be difficult to accommodate in situations where space is at a premium.

SUMMARY OF THE INVENTION

The invention has been developed in relation to measuring the linear movement of a clutch mounted on a gear shaft housing. A particular problem that arises is the requirement that the main elements of the transducer are to be mounted within the housing which is of a ferromagnetic material. However, the measurement technique described herein is of more general utility and is not limited to the application to clutches. The transducer system to be described provides a non-contacting measurement of the displacement of the clutch mechanism through a ferromagnetic wall provided by the housing of the gear shaft.

Aspects and features of the present invention for which protection is contemplated are set out in the claims following this description.

The present invention seeks to provide a technique which affords a magnetic-based transducer greater immunity from interfering fields. It also can be implemented in a compact form using a single sensor device for detecting a displacement-dependent magnetic field component. To this end a transducer element has a displacement-dependent field created therein by energisation of a pair of spaced coils or a single coil. The transducer region is subjected to short duration magnetic pulses of alternating polarity and a differential measurement is made on these pulses as detected by a sensor arrangement. Specifically the differential measurement is a peak-to-peak measurement Such a measurement can be satisfactorily realised with the aid of a single sensor device acting at a single location.

As will be explained hereinafter, the present invention can be implemented in hostile environments such as those subject to shocks and where interference fields of an unpredictable nature may occur.

Aspects and features of this invention are set forth in the claims following this description.

BRIEF DESCRIPTION OF THE DRAWINGS

The invention and its practice will be further described with reference to the accompanying drawings in which:

FIG. 1 is a longitudinal section through one embodiment of the invention;

FIG. 2 is a block diagram of an output circuit providing an output signal $V_o$ as a function of displacement S;

FIG. 3 illustrates a response curve of output $V_o$ v. displacement S;

FIG. 4a shows a coil energising waveform;

FIGS. 4b and 4c show output signals from a signal conditioner circuit in FIG. 2;

FIG. 5 shows another embodiment of the invention;

FIG. 18a shows a perspective view of a transducer assembly of a transducer element and sensor device applied to a shaft;

FIG. 18b shows an end view of the shaft and transducer assembly of FIG. 18a;

FIGS. 19a and 19b show perspective and end views of a modification to the shaft to house the sensor device within the profile of the shaft;

FIG. 20a illustrates a bipolar pulse drive current waveform for the coils of the transducer assembly;

FIG. 20b illustrates an output waveform representing the torque-dependent magnetic field component as detected by the sensor device;

FIG. 21 shows a drive circuit in which the transducer energising coils are connected, the circuit being in one half-cycle of operation;

FIG. 21a shows the drive circuit the next half-cycle of operation;

FIGS. 22a–22c shows the magnetic field in the transducer region of the shaft in successive half-cycles of operation for no-torque and torque conditions respectively;

FIG. 23 is a block diagram of a signal processing circuit for the sensor device signals;

FIG. 24 illustrates an application in a torque wrench adaptor, and

FIG. 25 shows a modification of the transducer assembly using a single energising coil.

DESCRIPTION OF THE PREFERRED EMBODIMENTS

Figure 6:
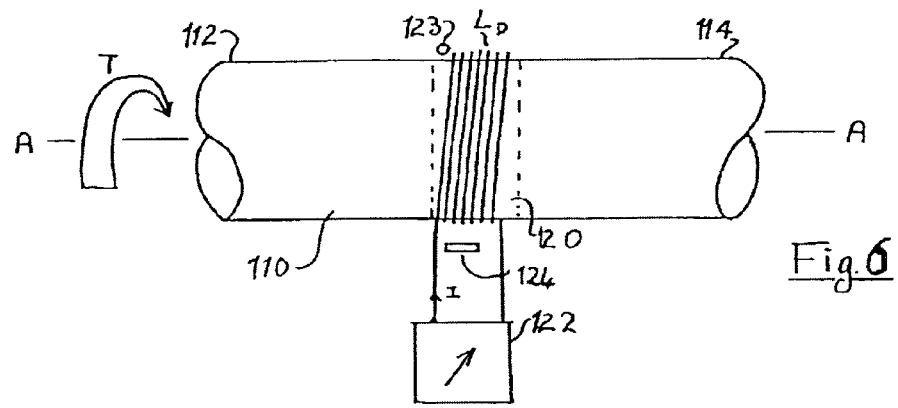
FIG. 6 schematically shows a shaft to which is mounted a transducer assembly.

FIG. 1 shows a longitudinal section through a tube 10 (closed in the circumferential direction) which is assumed to be of steel or other ferromagnetic material. The tube can, for example, house a gear shaft (not shown) extending along the axis A—A of the tube. A magnetic transducer assembly 20 is mounted within the tube and is required to respond to axially-directed displacements S of a mechanism (not shown) mounted exteriorly of the tube. To magnetically couple the transducer assembly to the exterior of the tube through the tube wall, a member 30 of ferromagnetic material is provided to move with the mechanism in the vicinity of the transducer assembly to influence the operation of the interior, assembly 20.

In one embodiment the transducer assembly comprises a coil 22, such as a helical coil, mounted at or closely adjacent the inner wall surface 12 of the tube, the coil being wound about the axis A—A. Closely adjacent each end of the coil is mounted a respective magnetic senior device MFS1 and MFS2 to respond to the axially-directed component of magnetic field. Suitable sensor devices include the magnetoresistive, Hall effect or saturating core type. The present invention has been implemented with saturating core type sensors connected in a signal conditioner and processing circuit of the kind described in published PCT patent application WO98/52063.

The coil 22 is energised with an alternating current and preferably a spiky, low duty cycle, bipolar pulsed waveform of the kind described below with reference to FIGS. 18a to 25.

Considering first the situation with the member 30 omitted, when the coil 22 is energised the magnetic fields closely adjacent the ends of the coil are sensed by devices MFS1 and MFS2 respectively. These devices can be interconnected to provide counteracting outputs which, if the sensed fields are of equal magnitude, will lead to a null resultant combined output. It does not necessarily matter if there is a residual offset.

Now consider the effect of the member 30. It is preferably realised as a ferromagnetic ring encircling the tube 10 and the coil 22 within it. The shape of tube and ring is most likely circular but this is not essential. The ring is a close fit to the exterior surface 14 of the tube but capable of sliding along the tube. The ring may be a part of the mechanism whose axial displacement is to be measured or a separate part affixed to the mechanism to move with it. It has been found that if sufficient magnetic field is present at the exterior surface 14 of the tube 10 to couple to the ring 30, the linear, axial movement of the ring affects the relative balance of the field components detected by sensor devices MFS1 and MFS2 respectively. The change in relative balance is used as a measure of the displacement (position) of the ring 30 along the axis A—A.

FIG. 2 shows a block diagram of a transducer output circuit 40 in which the sensor devices are connected. In FIG. 2 of signal conditioner circuit 42 of the kind described in WO98/52063 has the two devices MFS1 and MFS2 connected in opposition into the circuit. That is the resultant output $V_s$ of the circuit is at a null if the detected field magnitudes are in balance. The output signal which is an A.C. signal at the frequency of energisation of coil 22 is applied to a rectifier circuit 44, and preferably incorporating an integrator/filter circuit, to provide an output signal $V_o$ which is a function, preferably a linear function, of the displacement S along the axis A—A as indicated in FIG. 3.

The field generator coil is energised by a spiky bi-polar pulsed signal such as is indicated in FIG. 4a. FIGS. 4b and c show the corresponding output signals $V_s$ from circuit 42 related to different positions of the ring 30.

The mounting of the sensor devices MFS1 and MFS2 closely adjacent coil 22 raises similar considerations and may employ the techniques taught in relation to the transducer assembly for a magnetic torque transducer described below with reference to FIGS. 6 to 17.

The generation and use of the pulsed waveform indicated in FIG. 4a is more fully described below with reference to FIGS. 18a to 25.

For the adaptation of the teachings of FIGS. 18a to 25 and the description thereof, the following points are noted.

The material, particular the tube 10, is kept magnetically neutral. The build up of a remanent or stored magnetisation is to be avoided as far as possible. The proposed pulse driver waveform and its amplitude aims to keep the tube magnetically neutral on average over time.

The A.C. pulse drive should be of a sufficiently low frequency to penetrate or "look through" the tube wall. Typically the tube may be of 50 mm diameter with a 2 mm wall thickness. To this end a pulse frequency of 100 Hz or less is considered desirable and more preferably at lower frequencies down to the 20 Hz region. For smaller tubes with a wall thickness less than 2 mm higher drive frequencies can be contemplated.

The sensitivity of the complete transducer including the exterior member 30 is also a function of the drive current. With the pulsed current disclosed, the short duration current pulses themselves may be of, say, 2A magnitude. Due to the low duty cycle the average current magnitude is likely to be about 100 mA.

The benefits of the A.C. pulse energisation disclosed are:

no offset through temperature or magnetic stray fields;

lower average current consumption;

easy to filter signal and to eliminate noise;

material kept magnetically neutral.

A second embodiment of the invention is illustrated in FIG. 5 in which the tube 10 and slidable member 30, e.g. a ring, are as before. However the transducer assembly 50 in this case uses a pair of axially-spaced coils 52 and 54 in the region 16 between which a magnetic field sensor device MFS is mounted and connected into a signal conditioner circuit as previously described (FIG. 2). MFS responds to a longitudinal field component The coils are series connected to be driven by an A.C. pulse waveform as described above. The series connection is such that the fields generated by the coils in region 16 are in opposition and act to null each other at the device MFS. The ring member 30 encircles the tube 10 and the region 16 to interact with the coil fields. The balance of the fields is affected by the axial position of member 30 to enable a position-dependent output signal to be produced. It is assumed that the coils are of the same size, including number of turns, for the series connection shown. The coils could be parallel energised. Different size coils could be employed.

It will be recognised that the embodiments of the invention described above have been described in relation to circumstances where the movable part of the transducer is separated from the other parts by a magnetic barrier which needs to be penetrated.

The techniques described can be applied where the tube 10 is of non-magnetic material or not present in any form.

The embodiments described have a movable member 30 displaceable relative to a fixed transducer assembly 20. It is the relative displacement which is of interest. The transducer assembly 20 could be movable with respect to a fixed member 30.

The teachings described above can also be applied to a transducer in which the member 30 is disposed inwardly of the transducer assembly. The same balanced detection techniques are also applicable to a case in which the relevant axis is curved, e.g. an arc of a circle.

The teachings described above can also be applied to a transducer or transducer assembly in which the one or more sensors MFS, MFS1, MFS2 and one or more coils 22, 52, 54 are disposed inwardly of the tube 10, the tube 10 being hollow at least along a part of its length. In such an embodiment, the member 30 may either be mounted outside of the tube 10, or internally of the tube 10, one of either the sensor assembly MFS, MFS1, MFS2, or the member 30 being fixed and the other being connected to the movable tube 10.

FIGS. 6 to 25 described below are included to demonstrate the teachings of the mounting of the sensor devices MFS1, MFS2 described above closely adjacent a coil (which raises similar considerations and may employ the same techniques taught in relation to the transducer assembly for a magnetic torque transducer described below), and the possible energisation of the coil(s) described above with an alternating current.

Torque Measurement

FIG. 6 shows a shaft 110, which is assumed to be of circular cross-section and which is mounted for rotation about its longitudinal axis A—A. The shaft may continuously rotate, rotate over a limited angular range, or even be held at one end while torque is applied at the other. Torque T is shown as applied at end 112 to drive a load (not shown) coupled to end 114.

A coil $L_D$ is mounted about a region 120 of the shaft which is to act as a transducer region for measuring torque in the shaft. At least the transducer region of the shaft is of ferromagnetic material. The transducer region should have an axial length sufficient for the establishment of the desired field within the material of the shaft and allowing for axial displacement of the shaft with respect to the coil as may occur in some practical applications. The region 120 is indicated by the dash lines which are notional limits. The coil $L_D$ is a helical coil, single or multi-layer, coaxial with shaft axis A or it may be pile wound on a former, The coil is energised by a source 122 about which more is said below. At least one sensor device 123 is mounted closely adjacent the coil $L_D$ and region 120, that is the device 123 is closely adjacent the axial hollow in the coil in which the shaft is received. The device 123 is oriented to have its axis of maximum sensitivity in a tangential or circumferential direction. At least one sensor device 124 is mounted adjacent the coil to have its axis of maximum sensitivity in the axial or longitudinal direction. The functions of sensors 123 and 124 correspond to the sensors 123 and 124 respectively seen in FIG. 8a of WO01/27584. The sensors may be of the Hall-effect or magnetoresistive type but preferably are of the saturating core type connected in a signal-conditioning circuit such as disclosed in published PCT application WO98/52063. The saturating core sensors have a figure-of-eight response the maximum of which is along the core axis and the minimum of which is perpendicular to this axis. The three-dimensional response is the rotation of the figure-of-eight about the axis of maximum sensitivity. The source 122 which energises the coil $L^D$ may be D.C. or A.C. is discussed more fully below. Preferably the source is adjustable to control the level of energisation of coil $L_D$.

Figure 7:
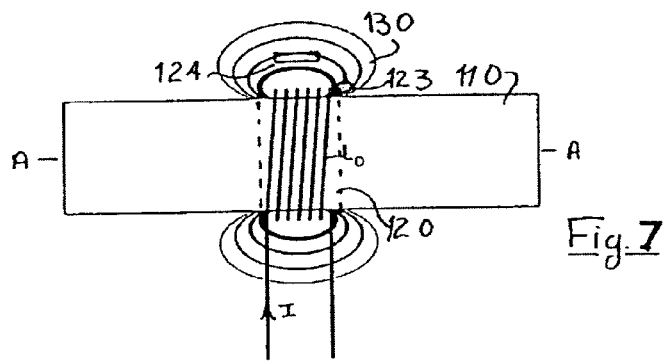
FIG. 7 illustrates the detectable external magnetic field generated by the energised coil of the assembly of FIG. 6.
Figures 8A, 8B:
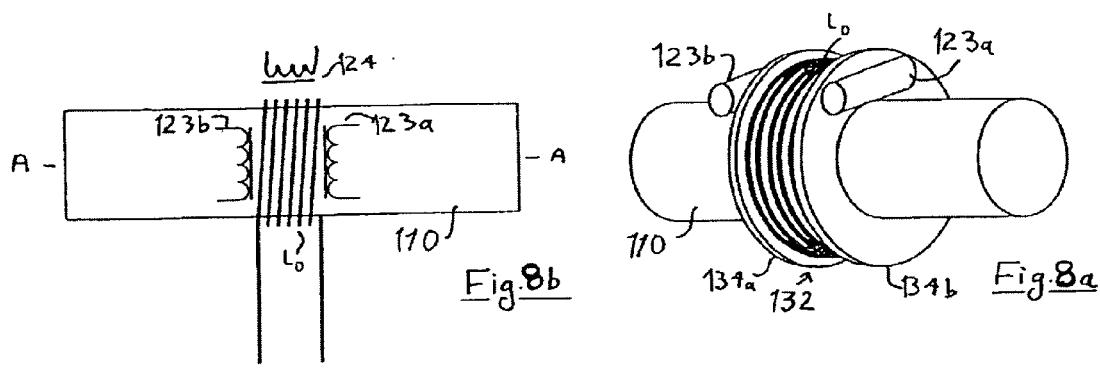
FIG. 8a shows a perspective view of a transducer comprising a unitary transducer assembly mounted on a shaft with a sensor device at each side of the coil.
FIG. 8b is a schematic illustration of the transducer of FIG. 8a with the addition of a reference sensor device.

WO01/27584 discloses in FIG. 8a thereof, how a longitudinal field is generated between two spaced coils wound about a shaft. The transducer region is in the zone between the two coils. In contrast, in the embodiment of FIG. 6 the transducer region lies within and extends somewhat beyond the excitation coil $L_D$. FIG. 7 shows the general form of the external field 130 generated by a current I applied in coil $L_D$. It extends in an annulus about axis A—A. It will extend in an annulus of axially-directed magnetisation (longitudinal magnetisation) within the transducer region 120. The annulus extends inwardly from the shaft surface. The internal field is not shown in FIG. 7. For best results the coil $L_D$ should couple as closely as possible to the ferromagnetic transducer region 120. The coil may be wound on a former that closely fits over the shaft 110, while allowing rotation of the shaft within the former. It has been found that the field 130 close in to the coil $L_D$ and closely adjacent the region 120 is torque-sensitive and provides a tangentially-directed component under torque whose polarity and magnitude are dependent on the direction and magnitude of the torque applied about axis A—A. The sensor 123 is positioned to be responsive to this tangentially-directed component. The sensor 124 is positioned to provide a signal representing the overall level of field generated by coil $L_D$ preferably an axial component that is substantially unaffected by torque.

FIG. 8a shows a perspective view of a shaft 110 on which is mounted a close-fitting former 132 on which the coil $L_D$ is wound. The former 132 has end cheeks 134a and 134b closely adjacent to which and the shaft surface are mounted sensor devices 123a and 123b with their axes of maximum sensitivity tangential to the shaft. The arrangement is shown schematically in FIG. 8b in which the devices 123a and 123b are represented as inductances wound on saturating cores. As already indicated, the coil 124 can be mounted in the vicinity of the coil $L_D$ at any point where there is an axially-directed field component from which a reference signal can be generated against which the torque-dependent signals from sensors 123a, 123b can be measured or, put another way, which is used to control the gain of the transducer.

Figure 9:
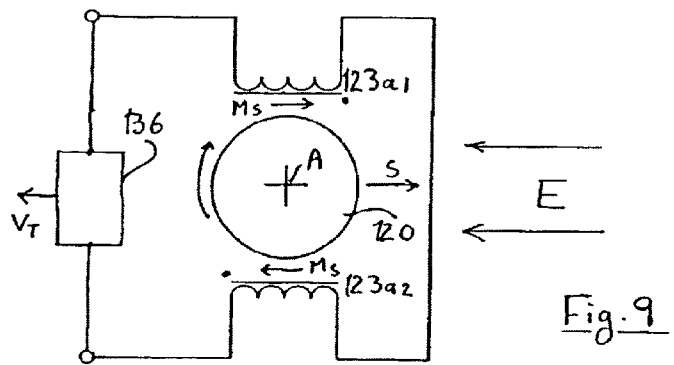
FIG. 9 illustrates a sensor arrangement with two inductive-type sensor devices (saturating core sensors) arranged to provide cancellation of an extraneous field.

FIG. 9 shows how each sensor device 123a, 123b can be provided as a sensor arrangement comprising a pair of radially-opposite sensor devices. FIG. 9 shows a cross-section through transducer region 120 and shows the sensor device 123a as now being a sensor arrangement comprising a pair of devices 123a1 and 123a2 mounted on opposite sides of the transducer region 120 of shaft 110, i.e. diametrically opposed with respect to axis A—A. The remainder of the transducer assembly is not illustrated. In the cross-sectional view of FIG. 9 the torque-dependent field components are denoted Ms and are oppositely directed on diametrically opposite sides of region 120 so that the respective device coils 123a1 and 123a2 are connected in series additively as regards the torque-dependent components Ms but are connected subtractively to cancel an external field E acting on both sensor devices in common. The sensor devices 123a1 and 123a2 are connected in series to a signal-conditioner circuit 136 from which is obtained a torque-representing output signal, $V_T$.

The shaft 110 may be subject to a bending moment causing a deflection of it at the transducer region 120 from the axis A—A. The shaft may also be subject to some wobble of its axis in its rotation. If the shaft deflects perpendicularly to the direction of arrow s, that is toward one of the sensor devices and away from the other, the one device will provide a larger signal output than does the other. Because the outputs are additively connected, such a deflection will be compensated, at least to some extent, The compensation is not exact because the field strength sensed by the devices is a square law function of distance from the shaft surface. But normally such deflections are expected to be small and a high degree of compensation is afforded.

If the deflection is in the direction of (or opposite to) the arrow s, provided that it is small and within the lateral sensing extent of the sensor devices i.e. not resolvable by the devices, the combined signal output will not be affected. As the deflection increases, each sensor device 123a1, 123a2 yields a lesser torque signal output. However, there is also a signal generated in each device due to the deflection itself even if the shaft is not rotating. The deflection is a common mode effect and is cancelled by the connection of the two devices. This subject is further discussed below with particular reference to FIG. 12.

Figure 10:
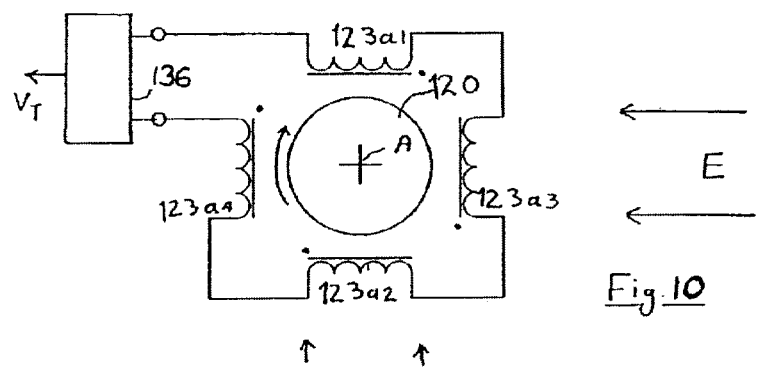
FIG. 10 shows a sensor arrangement of four sensors providing cancellation of extraneous fields.

The sensor arrangement disposed adjacent one end of the coil $L_D$ can be extended further. For example FIG. 10 shows an additional pair of sensor devices 123a3 and 123a4 mounted diametrically radially opposite one another with respect to transducer region 120 and orthogonally with respect to devices 123a1 and 123a2. Devices 123a1 and 123a2 are additively connected with one another, and with devices 123a1 and 123a2 as regards the torque-dependent field components but are subtractively connected with respect to a magnetic field component E'.

It will be appreciated that the same use of one or more pairs of sensor devices can be adopted for sensor device 123b of FIGS. 8a and 8b. It will also be noted that it is not necessary for the sensor devices 123a and 123b, or the more complex sensor arrangements thereof, to be aligned in angular disposition about the shaft. It will be also appreciated that each sensor device can be connected into a respective detection circuit and the outputs of the individual circuits combined as required.

Figure 11:
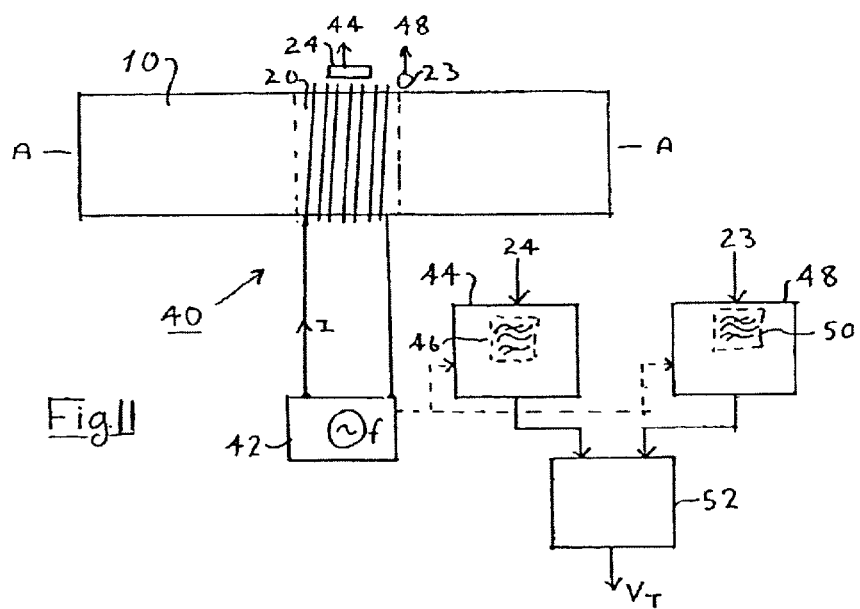
FIG. 11 schematically shows an A.C. energised transducer system.

The description of the practice thus far has assumed a D.C. energisation of the coil. This leads to what may be called a D.C. magnetic field. For reliability of response in using a D.C. field, it is desirable that the shaft 110 be subject to a de-gaussing or magnetic cleansing procedure as is described in above-mentioned WO01/79801. In the sensor arrangements discussed above, the adoption of a D.C. magnetic field leads to the fastest torque-signal response with the circuitry currently in use. That is the overall circuitry exhibits the highest bandwidth for signal changes. However, A.C. magnetisation may also be employed. A.C. energisation has some advantages but also entails consideration of other factors. An A.C. transducer system 140 is illustrated in FIG. 11 and may be compared to that shown in FIG. 12 of WO01/27584. An A.C. source 142 energises coil $L_D$ at a frequency f. The source may be a bipolar pulse source. A signal conditioner circuit 144 connected to sensor arrangement 124 is provided with a filter function 146 to extract the magnetic field component at frequency f detected by sensor arrangement 124. The filter may be driven from the source 142 to ensure the filter 146 tracks the source frequency f as is indicated by the chain line. Synchronous detection in which a detector in circuit 144 is driven by a signal from source 142 may be employed. Similarly the sensor arrangement 123 is connected into a frequency-selective signal conditioner circuit 148 including filter function 150 to provide an output representing the torque-dependent field component. This component together with a reference level component obtained from circuit 144 is applied to a signal processing circuit 152 from which a torque-representing output $V_T$ is obtained. It will be understood that the filtering and signal-processing functions may be performed in hardware or software and that the filtering may be performed at various points in the complete signal path. It is desirable that the operating frequency f of the source/filter system be selected to be well-distinguishable from frequencies of potential interfering sources, e.g. power (mains) frequency.

Saturating-core types of sensor are capable of operating up to 110 kHz or more but in addition to the sensor response consideration has to be given to the source frequency response in its ability to drive the coil $L_D$. There is another frequency-dependent characteristic to be considered, particularly when the transducer region is an integral portion of a shaft.

The depth of penetration of the coil field into the material of the transducer region is frequency-dependent. It is greatest at zero frequency, i.e. D.C., and decreases as the drive frequency increases. For example, a shaft of FV250B steel of a diameter of 18 mm, was penetrated entirely by a D.C. energised coil but was not entirely penetrated by the equivalent A.C. current at 100 Hz. Penetration of the entire cross-section of the transducer region is not essential as the torque-dependent response tends to be concentrated in a surface-adjacent annular zone. However, as the frequency increases it is found that the gain or slope of the transfer function—the torque-dependent signal output v. applied torque—will have a tendency to decrease.

The transducer and transducer assembly described above provides the following benefits:

the assembly of coil (with former) and sensor arrangement or arrangements can be manufactured as a unitary component mountable to a shaft; the unitary structure may also comprise signal conditioning and processing circuitry;

the manufacturing process does not require any encoding procedure for the transducer region to establish a permanent magnetisation therein; in a homogeneous shaft, there is freedom as to where the transducer region is to be established and there is no critical aligning of the transducer assembly with a predetermined region of the shaft.

there is no degradation of the magnetisation of the transducer region over time as can occur with a permanent magnetisation;

the gain or slope of the transfer function of the transducer is a function of the drive current to the transducer coil. It has been found that short of energisation current levels creating a non-linear response, response sensitivities are obtainable substantially greater than achievable by the aforementioned profile-shift magnetisation;

the transducer is insensitive to axial displacement of the transducer region with respect to the transducer coil/sensor assembly;

the ability to operate in an A.C. fashion at a selected frequency allows operation within a noisy environment and renders the transducer more tolerant of stray magnetisms in the shaft.

Figure 12:
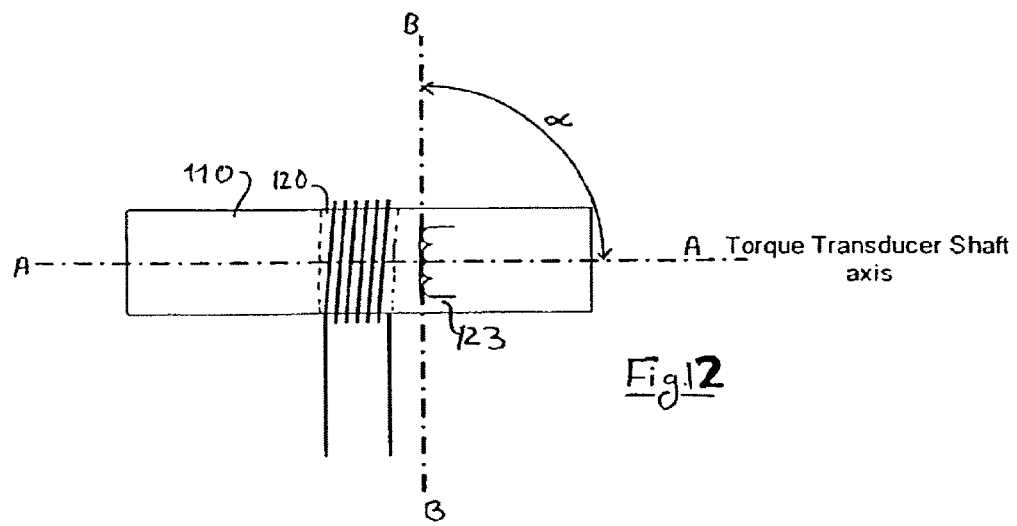
FIG. 12 illustrates factors to be considered relating to movement of the shaft relative to the transducer assembly.

Another factor to be considered for both D.C. and A.C. implementations is illustrated in FIG. 12 which shows the shaft 110, energising coil L and a sensor device 123 oriented to detect a tangential torque-dependent component. The axis B—B maximum sensitivity of a sensor device 123 is oriented at an angle of $\alpha$ to the axis A—A of the shaft. Axis A—A lies in the plane of the figure, axis B—B is parallel to and above the plane of the figure. Angle $\alpha$ is thus the angle between axis B—B as projected onto the plane of the figure and is ideally 90°. As compared to some forms of permanently-magnetised transducer regions, the transducer assembly described above is not sensitive to axial shifts of the transducer region, assuming the transducer region is bounded by shaft material homogeneous therewith as would be the case with a shaft homogeneous a long its length with which the transducer region is integral. However, the operation of the transducer assembly (coil plus sensor arrangement) is sensitive to axial skewing or tilting of the shaft relative to the assembly that affects the angle $\alpha$.

Attention will now be given to the sensitivity to axial skewing and measures to mitigate it. It will also be shown that conversely a transducer-assembly described above can be implemented to use axial skewing in an advantageous manner to enable a measurement of a force to be made.

Referring again to FIG. 12, consider the situation where there is no torque in the shaft 110 but the shaft axis tilts relative to the axis of coil $L_D$ so that the angle $\alpha$ is no longer 90°. The coil is energised.

The result is a transverse component of the magnetic field generated by the coil $L_D$ which is detected by sensor device 123. If a sensor arrangement such as shown in FIG. 9 is employed the skewing, indicated by arrow S, will be in the same direction relative to both sensors 123a1 and 123a2. As regards the detected field, the skew acts as a common mode component and is cancelled in the output similarly to the common external field E. This common mode rejection is equally obtained when the shaft is under torque. When under torque a skew orthogonal to arrow S will tend to increase the component $M_s$ at, say, sensor device 123a1 and decrease component $M_s$ at sensor 123a2 with little effect on the combined output signal $V_T$. This is true generally of wobble of the shaft 110 in its rotation. This foregoing reasoning can be extended to the sensor arrangement of FIG. 10 with reference to a skew orthogonal to direction S.

Figure 13:
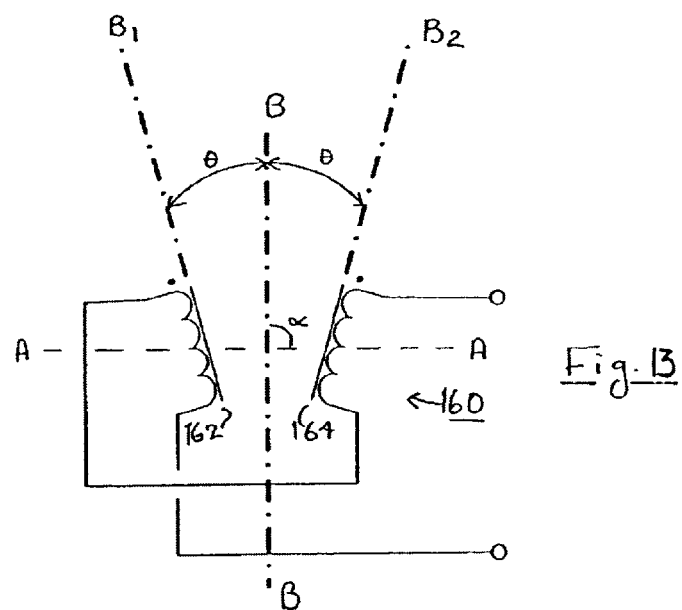
FIG. 13 illustrates one sensor arrangement for reducing the sensitivity to axial skew or tilt of the transducer assembly relative to the axis of the transducer region.

Another approach can be adopted to making an individual sensor such as 123 in FIG. 12 less sensitive to skew. This is illustrated in FIG. 13 in which the single sensor device 123 is shown as being replaced by a sensor unit 160 comprising a pair of devices 162 and 164. The shaft as such is not shown but its axis A—A is indicated. B—B is the axis of response of sensor 160, desirably at an angle $\alpha=90°$ to axis A—A. the two sensor devices are offset at an angle θ to each side of axis B—B, that is their respective axes $B_1$, $B_2$ maximum sensitivity are separated in a "V" formation by angle 2θ.

In measuring a torque-dependent field component, which affects both sensor devices substantially equally, if there is a tilt—α moves from 90°—the field sensed by one device increases while the field sensed by the other decreases. If the two devices are connected additively, dot to non-dot end, the resultant signal is far less affected by angular skew or tilting than that of a single device, particularly for small deviations of α from 90°. This would normally be the case. The angle of deviation should not exceed the angle θ.

Force Measurement

The immediately preceding discussion has been concerned with measuring torque in the presence of an angular tilt or skew of the shaft relative to the transducer coil assembly and its associated sensors. One circumstance in which such a skew or tilt may arise is if the shaft, the torque in which is to be measured, is subject to a transverse force leading to a bending moment in the shaft at the location of the transducer region. The sensitivity to any resultant axial tilt or skew, in the absence of compensatory measures, can be utilised to measure the applied force. Furthermore, this force measurement is not restricted in its application to a shaft in which a torque is transmitted. The force measurement can be applied to any elongate member subject to a bending moment due to an applied force or even an elongate member pivotally mounted to turn about the pivot axis in response to an applied force. The elongate member is to be capable of supporting or having incorporated into it a transducer region with a transducer assembly as has been described above but with a modified sensor arrangement FIG. 14 shows an elongate member 170 which is fixed at one end 172 and the other end portion 174 of which is free to move under a force F applied transversely of a longitudinal axis A—A of member 70. The member 170 is resilient and relatively stiff so that it yields to the bending moment impressed by the force F to deflect at an intermediate region 176 to an extent which is function of the applied force. The intermediate region 176, at least, is of ferromagnetic material and provides a transducer region for a transducer assembly 178 comprising an excitation coil about region 176 and a sensor arrangement configured to respond to the deflection of the member 170 with respect to the axis of the coil of transducer assembly which remains aligned with the axis A—A of the unstressed member 170 with no force F applied to it. The transducer assembly is constructed as previously described and with particular reference to the detection of tilt or skew. The effect of the deflection of the elongate member is that of the angular tilt or skew already described, where the shaft 110 is no longer a torque transmitting part but is now replaced by the deflectable elongate member 170.

Figure 14:
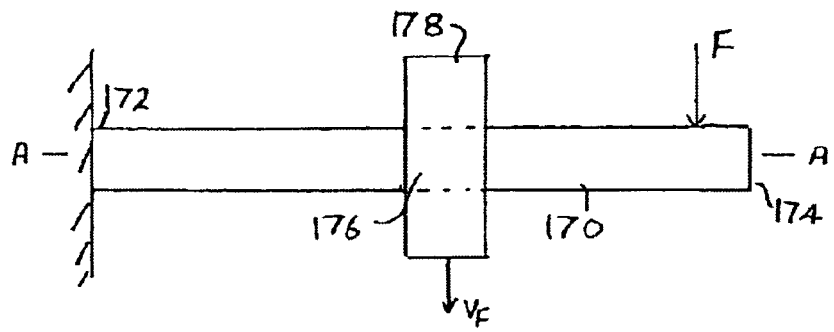
FIG. 14 illustrates one embodiment using a transducer in the measurement of a force by utilising the sensitivity to tilt or skew.

By way of example, if the sensor arrangement in assembly 178 of FIG. 14 uses a pair of diametrically opposite sensor devices as shown in FIG. 9, consider a connection of the sensor devices 123a1 and 123a2 to circuit 136 in which one of the devices is now reverse connected, e.g. dot end to dot end, the connection does not cancel the skew or tilt S due to force F in FIG. 14 but adds the contributions from the sensor devices due to S to provide the force-representing signal $V_F$ in FIG. 14. If the circumstances were such that it was desired to measure the skew or tilt S of the shaft 110 without interference by the torque in the shaft, it will be seen that the reversal of the connection of the sensor devices 123a1 and 123a2 in FIG. 9 not only provides an additive response to skew or tilt but cancels the torque components $M_s$.

A transducer assembly 178 of FIG. 14 having the coil arrangement of FIG. 13 can be also adapted to measure the force dependent deflection of member 170 by reversing the connection of one sensor device so that the devices 162 and 164 are, for example, connected dot end to dot end. The output now obtained represents the tilt angle θ.

Figure 15:
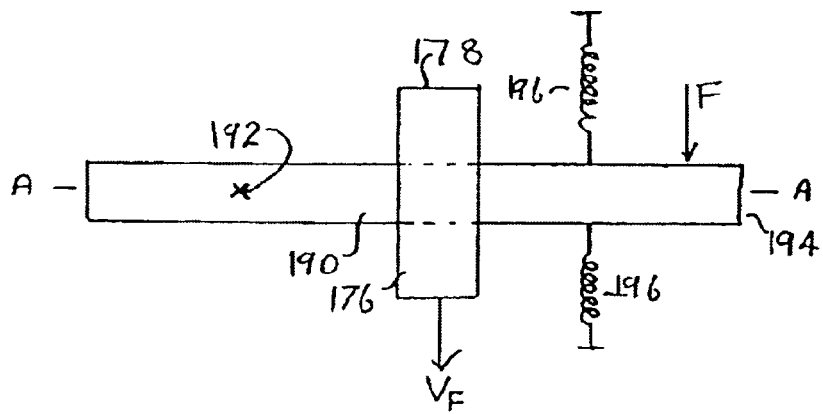
FIG. 15 illustrates a second embodiment for the measurement of a force.

While FIG. 14 shows the use of an elongate member the resilience of which resists the applied force F and the resultant bending moment in which causes the measurable skew or tilt, the equivalent result could be achieved by the modification shown in FIG. 15 in which an arm 190 pivotally mounted at 192 to pivot in the plane of the figure has the force F to be measured applied at its free end 194. The force is resisted by resilient means 196, such as a spring or a magnetic-force restoring means which is particularly usable where the whole arm 190 is of ferromagnetic material. With zero force F applied the axis A—A of the arm 190 is aligned with the axis of the transducer assembly constructed as described above to provide the force-representing signal $V_F$.

Figure 16:
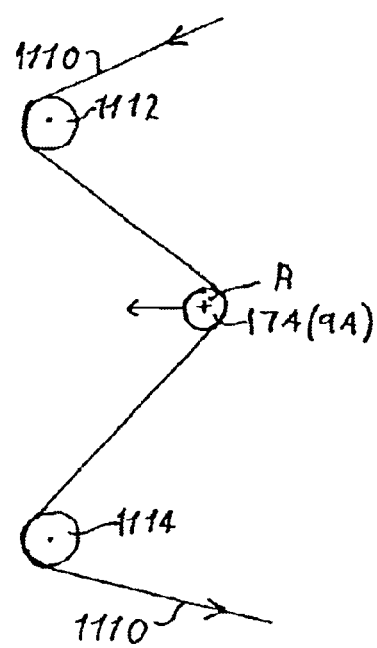
FIG. 16 shows an implementation of the force-measuring embodiment of FIG. 14 or 15 in measuring tension in a running thread or other similar lengthwise-moving flexible item.

An example of the application of the above described transducers and transducer assemblies to the measurement of a force or bending moment is illustrated in FIG. 16. This figure illustrates a system for measuring the tension in a running thread such as found in a weaving or other textile machine. The system employs a force measurement transducer as shown in FIG. 14 or FIG. 15.

In FIG. 16 the thread 1110 moves in a path over pulleys or rollers 1112 and 1114 between which the path is angled into a V-shape by the offset introduced by the end portion 174 (194) of the elongate member 170 (190) of FIG. 14 (110) which is mounted to have its axis A—A at least substantially normal to the plane of the drawing. The end portion 174 (194) may be configured to allow free running of the thread over it. The angle introduced into the thread path by portion 174 (194) results in a force F being exerted on portion 174 (194) which is measured by the transducer of FIG. 14 ( 110) as described above.

Figure 17:
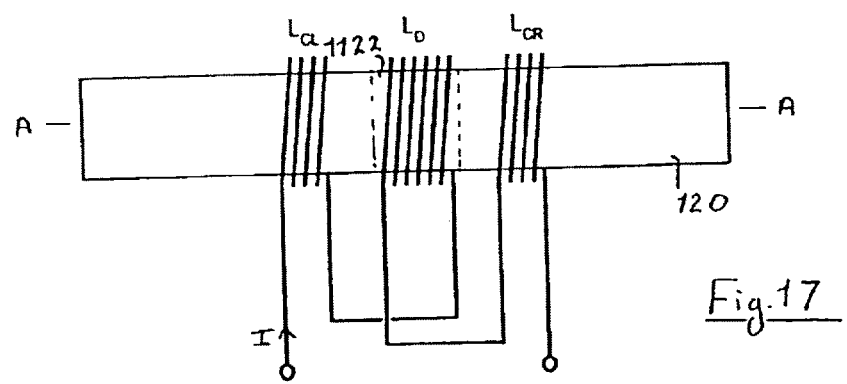
FIG. 17 shows a modification of the transducer assembly including further coils to reduce the possibility of establishing remanent magnetisation in the transducer region.

FIG. 17 illustrates a modification of the embodiments of the transducers and transducer assemblies described above in which provision is made to prevent the creation of a bar magnet in the shaft or elongate member in which the transducer region is incorporated. This applies particularly to D.C. energised transducers but may also be applied to reduce the likelihood of residual magnetisation occurring in A.C. energised transducers.

FIG. 18 shows a shaft or elongate member 1120 on which an excitation coil $L_D$ is mounted about transducer region 1122. The sensor arrangement is not shown. To each side of coil $L_D$ a respective coil $L_{CL}$ and $L_{CR}$ is mounted. The coils $L_{CL}$ and $L_{CR}$ are energised at the same time as coil $L_D$. as by being connected in series therewith as shown in FIG. 17, and generate fields of opposite polarity to that generated by coil $L_D$. The coils $L_{CL}$ and $L_{CR}$ are sufficiently spaced from coil $L_D$ to allow the desired transducer region field to be generated and sensed in the manner already described.

More specifically, each of the three coils produces an individual field as shown in FIG. 7. Taking coil $L_{CL}$ as an example the field toward coil $L_D$ is of the same polarity as that of coil $L_D$ towards coils $L_{CL}$, i.e. the fields tend to repel one another. An equivalent situation arises between coils $L_D$ and $L_{CR}$. The coils $L_{CC}$ and $L_{CR}$ should not be so close to coil $L_D$ as to adversely affect the torque- or force-dependent field which it is sought to measure. The effectiveness of the coils $L_{CL}$ and $L_{CR}$ in reducing the formation of a bar magnet in shaft or elongate member 1120 may be judged by a sensor located to detect the axial field extending outwardly of a coil $L_{CL}$ or $L_{CR}$. This field should be reduced to substantially zero. Experiments have shown that such a result can be achieved by having the coils $L_{CL}$ and $L_{CR}$ generate half the ampere-turns of coils $L_D$ so that for the series connection shown with a common current, coils $L_{CL}$ and $L_{CR}$, have half the number of turns of coil $L_D$.

The shaft or elongate member in which the transducer region is created may be subject to a de-gaussing procedure prior to being put into use. Such a procedure is described in published PCT application WO01/79801.

FIGS. 18a and 18b show the physical arrangement of a torque transducer. It is applied to a shaft 210 which is rotatably mounted about a longitudinal axis A—A about which a torque T is applicable. The torque may be clockwise (CW) or counter-clockwise (CCW). The shaft does not necessarily have to rotate continuously or at all. The shaft 210 is assumed to be of circular section with the axis A—A being central. The shaft or at least the region of it of interest to transducer operation is of ferromagnetic material. Two coils 212 and 214 are mounted to be wound about the shaft and are energisable to induce an axially-directed (longitudinal) magnetic field in the shaft. The coils are spaced apart and define therebetween a transducer region 216 of the shaft. In the embodiment shows the coils are connected in series to receive an energisation current 1, the coils being connected in series in additive fashion to co-operate to generate a longitudinal magnetic field in region 216 generally indicated by arrow M. The generated field is discussed below. The direction of field M depends on the polarity of current I.

The longitudinal field M is axially-directed but is deflected by torque T acting about axis A—A in transducer region. Although the field is primarily confined within the material of the shaft, an external field component will arise which affords the possibility of detection of the field by a non-contacting sensor arrangement. The deflection under torque creates a tangential or circumferentially-directed field component whose magnitude and direction is a function of the direction and magnitude of the torque. This component can be detected by a magnetic field sensor device 218 which as shown in FIGS. 18a and 18b is tangentially oriented to be sensitive to the circumferentially-directed or tangential component. Commonly available sensor devices have an axis of a broad maximum response and a minimum response at right angles to that axis, or more specifically in a plane at normal to that axis. Magnetic field sensing devices that may be employed include Hall Effect, magnetoresistive and inductor (saturating core) types. They are available as small units. One particular device which has been satisfactorily used is the saturating core type of device connected in a signal conditioning circuit of the kind disclosed in WO98/52063. As will be explained below, a single sensor device may be used in the practice where prior magnetic transducers would have required two or more sensor devices for cancellation of an interfering magnetic field, such as the Earth's field. This assists in placing the transducer assembly in a location where space is at a premium. An example is given in FIG. 24 below.

To make the transducer more compact still, FIGS. 19a and 19b illustrate a modification to position the sensor device within the confines of the outline or profile of the shaft 210. Whereas in FIGS. 18a and 18b, the device 218 is external to the cylindrical profile of the shaft 210, in FIGS. 19a and 19b, the transducer region 216 (the coils are not shown) has a notch or recess 217 within which the sensor device 218 is received so as to be recessed within the circular outline of the shaft. The device could be received within a bore in the shaft. The modification of the housing of the sensor device 218 within the shaft profile, or substantially so, also brings an attendant advantage that the device is going to be in a stronger magnetic field.

The arrangement of FIG. 19a needs additional measures where the shaft 210 is to rotate continuously or is rotatable over a given arc—for example the shaft may move back and forth—with respect to a fixed sensor device 218, or where the sensor device 218 is to rotate with the shaft 210 over whatever angle is appropriate.

In the case where the sensor device is held fixed, the notch or recess 217 can be extended as far as necessary to form a groove entirely or partly around the shaft as indicated at 217a in FIG. 19a. This measure may be applied to the torque drive or adapter unit of FIG. 24 where the sensor device is fixedly mounted to the wall of housing 250. It is easier to connect the sensor device into signal processing circuitry in this case. Nonetheless it is possible to have the sensor device mounted to the shaft to rotate therewith. For example, in the embodiment of FIGS. 19a and 119b the sensor device 218 secured in the recess as shown could be connected to slip rings extending around the shaft and engaged by fixed contacts. The connections could be made to run along an axial bore in the shaft to a suitable signal pick-off point. The sensor device could be incorporated in a complete self-contained unit mounted in notch or recess 218 designed to radiate a torque-dependent signal to a separate receiver as by induction coupling (magnetic coupling) or by electromagnetic radiation or any means by which a remote communication link is established.

Reverting to FIG. 18a, there is shown a source 220 for supplying energising current I to the series connected coils 212 and 214. It is an important feature is that the energising current waveform be bipolar pulses of low duty cycle, e.g. short duration, spiky pulses. The adoption of such a waveform leads to important operational advantages as compared, for example, to the use of a bipolar pulse waveform of essentially 100% duty cycle such as a bipolar square wave. An energising current waveform suitable for the practice of the invention is shown in FIG. 20a. the magnetic field pulse waveform will follow the current waveform. It will be realised that such a current waveform can be generated by differentiating a bipolar square wave. However, the precise waveform nor the means of generating it is not restricted to a differentiated bipolar square wave. It does serve, however, to indicate the nature of a short duration, spiky pulse wave of alternating polarity (AP) magnetic field pulses generated in the transducer region 216. The current pulse generating source 220 has its frequency controlled by a frequency source 221 though, of course, the two sources could be realised by a single unit. Source 221 is preferably a frequency-stable square wave source at a frequency unrelated to the local power (mains) frequency.

FIG. 21 shows a simplified circuit for the drive source 220 to which the coils 212 and 214 are connected. The coils are connected in series with a capacitor C across one diagonal 222 of a switching full-wave bridge circuit 224 to the other diagonal 226 of which a D.C. power supply is connected. Controllable switches S1–S4 in respective arms of the bridge are controlled to generate a bipolar waveform across diagonal 222 which is subject to the differentiation characteristic provided by capacitor C to generate short current pulses of low duty cycle in the series coils 212, 214. The switches S1–S4 are implemented in practice by any appropriate kind of controllable switch device, such as a semiconductor device. The switch devices have respective control inputs for receiving switching control signals B and NOT-B at a desired frequency derived from the source 221 of FIG. 18, the switch pair S1 and S4 being turned on and off alternately and inversely with switch pair S2 and S3.

FIG. 21 shows the bridge 234 in one half-cycle of operation (switches S2 and S3 on with switches S1 and S4 off). As switches S2 and S3 close, current I is driven through the bridge and the coils 212 and 214 as shown by the arrows. The capacitor C enables a high initial current pulse to pass through the coils. The capacitor charges positively at junction with S2. The circuit parameters are chosen so that the pulse is short relative to the switching period of control signals B, NOT-B. FIG. 21a indicates the generation of the current pulse of opposite polarity in the next half cycle with S1 and S4 closed and S2 and S3 open. It will be seen from this figure that the generation of the pulse involves not only the charging of the capacitor to the opposite polarity but it is preceded by the discharging of the charge acquired on the previous half cycle.

The form of the magnetic pulses in the shaft will follow the current I in the coils rather than the voltage waveform applied across diagonal 222. The exact form of the current waveform is dependent on the inductance of the coils, which resists any sudden change in current, and substantially on the ratio of the inductance to resistance. The use of a series capacitor in the current flow, and specifically placed in the diagonal in which the coils are connected, leads to two advantages, the current waveform is predominantly controlled by the capacitor C as illustrated in FIGS. 20a and 20b and it provides an effective time constant relative to the pulse period (here, the interval between a pair of alternating polarity pulses) that is short so that the current has reduced to near zero for the first pulse before the next pulse is generated. Consequently there are no switching spikes due to interruption of significant current still flowing in the coils. The capacitative circuit also assists in developing symmetrical alternating pulses, e.g. in FIG. 20b $V_{T1}$ and $V_{T2}$ are of equal magnitude, minimising the possibility of building up a unipolar remanent magnetisation in the shaft due to the switched waveform itself.

The pulse current levels should be chosen to provide adequate signal output and signal/noise but without tending to produce undue levels of remanent magnetisation in the shaft material. This is consistent with obtaining the desired pulse waveform of FIG. 20b. The actual current level, or more specifically, the ampere-turns of field exerted on the shaft will be dependent on the size (diameter) of the shaft and the material of which it is made with particular regard to magnetic characteristics. For shafts in the range of 15–20 mm of industrial-type steels, e.g. FV250B, it is presently considered that the working emanated longitudinal field closely adjacent the shaft should not exceed about 30 Gauss.

It will be understood that the full-wave bridge 234 enables bipolar pulses to be generated from a unipolar power supply which may be of a single polarity with respect to a ground reference or a dual polarity supply.

The operation of the transducer is further demonstrated in FIGS. 22a–22c which shows the transducer region 216 with a tangentially-oriented saturating core inductor sensor device 218'. In these figures the longitudinal magnetic field M generated by the coils 212 and 214 (not shown) is indicated by multiple parallel arrows. FIGS. 22a and 22b apply to the field generated by pulses of one and other polarity respectively in the absence of torque (T=0). The field is axially-directed: there is no tangential field component to be sensed by device 218'. FIGS. 22c and 22d correspond to FIGS. 22a and 22b but in the presence of an applied torque. The field M is deflected or skewed in a direction dependent on the sense of the applied torque T and to an extent dependent on the magnitude of the torque. A resultant tangential field component is detected by sensor device 218' and a pulsed output signal $V_T$ is generated by the sensor circuitry as indicated in FIG. 20b. in synchronism the coil pulses. The output pulses are of alternating polarity and have a magnitude which is dependent on the applied torque. For an applied torque of opposite sense the sense of the output pulses would likewise be reversed. The output pulse train under no torque (T=0) and torque conditions (T≠0) is illustrated in FIG. 20b at the left and right respectively.

The amplitude of the individual output pulses is a measure of torque but is subject to error from interfering fields which may be unknown and unpredictable. Considering first D.C. or unipolar fields, they may result in an unknown level of the quiescent field $V_Q$ detected by sensor 218' on which the torque-dependent signal $V_T$ is superposed. Thus a measurement of the peak value of a single output pulse of the signal $V_T$ is error prone. An improved measurement of torque acting to cancel any D.C. interference component is obtained by making a $V_{PP}$ peak-to-peak measurement $V_{PP}$ between successive output pulses of opposite polarity, e.g. $V_{T1}$–$V_{T2}$. It will be appreciated that this peak-to-peak measurement technique enables a single sensor device in a single location to be used without interference from fields such as the Earth's magnetic field. Heretofore, cancellation of the Earth's field has required at least two sensor devices. A second step directed towards excluding local noise spikes that may occur is to gate the peak measurements in synchronism with the applied current waveform so that the peak measurement gate $t_g$ is only opened for a period in which each torque-signal output pulse is expected. Another way of approaching the same problem is to have a phase-sensitive detection arrangement synchronised to the drive current waveform.

FIG. 23 shows a block diagram of a processing circuit for the sensor output signals $V_T$. The sensor device 218(218') is connected to a signal conditioner circuit 230 which produces the torque-dependent output signals $V_T$ (FIG. 20b). This output is fed to a gate circuit 232 controlled by frequency source 221 (including control derived from the coil drive current waveform), The gate opens at the times $t_g$ related to the drive pulses at which a torque-dependent output pulse is expected. The pulses passed by gate 232 are applied to a peak-to-peak detector 234 whose torque-dependent peak-to-peak output $V_{PP}$ is used as the wanted torque-output signal, subject to any smoothing or other processing required.

The gating technique assists in discrimination against random magnetic noise spikes. It will also be understood that by selection of the frequency of operation of the source 220, e.g. bridge 224, additional discrimination can be obtained against noise related to the local power (mains) frequency.

One particular application is for a torque wrench adaptor acting between the shaft of a power torque tool and a nut or bolt head to be tightened 29 or loosened). Such an adaptor is shown in FIG. 24. The adaptor 240 has an upper circular cylindrical body 242 having a shaped input recess 244 for receiving a matching keyed output shaft of a power tool. Descending from body 242 is a reduced diameter body 246 in the form of a short shaft terminating at its lower end in a key 248 to engage a matching nut or bolt head. The adaptor is received in a housing 250 which allows little room to receive magnetic field sensor devices. It is of major concern in many assembly industries to be able to measure the torque actually exerted by the adaptor 240 on the nut or bolt with which it is engaged. The adaptor will normally receive a series of impulses of increasing torque from the power tool and, particularly in the case of impact-action power tools, the nature of the successive impacts may be deleterious to a magnetic-based, torque transducer assembly fitted around a region of the shaft 246 relying on stored magnetism and used as a transducer element. Apart from the violent shocks to which the adaptor is subject, there is always the possibility of interfering magnetic fields being set up through the adaptor between the power tool and the product on which it acts as well as a generally noisy environment particularly related to mains power.

It is thus considered that the above described transducer and transducer assembly may be used advantageously in such a hostile environment by applying the teachings described above to the shaft body 246 to measure the torque therein. Furthermore a transducer assembly of the type described above can be assembled in the restricted space available. The coils would about the shaft 246 require little space external to the shaft. The sensor arrangement requires only one sensor device and that may be located within the profile of shaft 246 by adopting the arrangement of FIG. 18b.

The ability to operate with a single tangentially-oriented sensor device does not preclude the adoption of multiple such sensor devices where circumstances warrant. There is still advantage to be gained in cancelling out any "D.C." magnetic fields by using a pair of sensor devices located and connected additively as regards the torque to be measured but in opposition as regards an interference field to be cancelled. Such sensor arrangements are discussed in the prior art referred to above.

The transducer assembly has been described thus far with reference to a transducer element defined between a pair of coils, as shown in FIGS. 18 to 24. As is described above with reference to FIGS. 6 to 17, a tangential or circumferentially-directed, torque-dependent magnetic field component can be obtained with a single coil. FIG. 25 shows the principle of such an assembly. A transducer region 216' of a shaft 210 is defined by the position of a single coil 212'. Energisation (I) of the coil creates an axially-directed field in the region 216' with an accompanying external longitudinal field 217 which extends in an annulus about the shaft, When the shaft is subject to torque, a tangential or circumferentially-directed component-arises which is detectable by a tangentially oriented sensor 218". The sensor is mounted very close in to the coil in this case to be within the field generated by the coil. It may be housed within the profile of the shaft as in FIGS. 19a and 19b, As is more fully described with reference to FIGS. 6 to 17, the transducer assembly of FIG. 25 may also be applied to the measurement of a tilt or skew of the axis A—A of the shaft relative to the axis of the coil due to an applied force acting to tilt or skew the axis of the shaft, or other elongate member, as indicated in dotted line by arrows FF.

FIG. 25 also shows the possibility of using a second, axially-oriented, sensor device or devices 219 for detecting the external axially-directed component of the longitudinal magnetisation. This feature may be also employed with the earlier described two coil embodiment. Such a sensor device (s) can be used to provide a reference signal representing the field, strength generated by the coil or coils. The wanted peak-to-peak signal can be measured or calibrated against the reference level. The reference level can be used to control the gain factor of the transfer function of the transducer.

In the method described above for measuring torque in a part, for example a shaft, in which at least one coil, wound about an axis of the part about which axis torque is applied, is A.C. energised to create an alternating polarity magnetic field in the part which field emanates a component dependent on torque, and in which a magnetic field sensor arrangement is responsive to the emanated component to produce a torque indicating signal, the at least one coil is energised by a series of energising pulses of current of alternating polarity which pulses have a relatively small duty cycle, the sensor arrangement produces sensor pulses of alternating polarity corresponding to said energising pulses, and the sensor pulses are measured in a peak-to-peak fashion to produce an output signal representing torque.

The energising pulses are preferably generated by differentiating a switched waveform, for example a rectangular (including square) waveform, and the switched waveform is preferably applied to the at least one coil through a capacitor. The series of energising pulses may be generated by a switching bridge circuit to an input diagonal of which a D.C. input is applied and to an output diagonal of which said at least one coil is connected to receive an A.C. waveform due to the switching of the bridge circuit.

The circuit path through which said at least one coil is energised may include a series capacitor, preferably connected in series with said at least one coil to said output diagonal. In a preferred embodiment, the at least one coil comprises a first and second axially-spaced coils between which a transducer region of the part is defined.

Preferably, the first and second coils are connected in series to additively create an axially-directed magnetic field in said transducer region. The sensor arrangement may comprise a sensor device oriented to detect a tangentially or circumferentially-directed component of magnetic field. Preferably, the sensor arrangement comprises a single sensor device acting at a single location for detection of a tangential or circumferentially-directed component of magnetic field and preferably the sensor arrangement comprises a sensor device disposed externally to the body profile of the part.

In a preferred embodiment, the sensor arrangement comprises a sensor device disposed in a notch, recess or bore in the part so as to be disposed substantially internally of the body profile of the part. The sensor arrangement may comprise a single sensor device acting at a single location and oriented to detect a tangential or circumferentially-directed component of magnetic field.

As described above, the apparatus for measuring torque in a part, for example a shaft, about an axis of which torque is applied, may comprise at least one coil wound about said axis of said part, energising means for energising said at least one coil with alternating current to create an alternating polarity magnetic field in said part which field emanates a component dependent on torque in the part, and signal processing means including a magnetic field sensor arrangement responsive to the emanated component to produce a torque-indicative signal, wherein said energising means is operable to generate a series of current pulses of alternating polarity in said at least one coil, which pulses have a relatively small duty cycle, and said sensor arrangement is operable to provide a series of torque-dependent signal pulses of alternating polarity corresponding to said series of current pulses, and said signal processing means comprises a peak-to-peak detector responsive to said series of signal pulses to produce a torque-representing output signal dependent on the peak-to-peak value of said series of signal pulses.

The energising means may comprise means for generating a switched waveform, for example a rectangular (including square) waveform from a D.C. source and means for differentiating said waveform for application to said at least one coil. The means for differentiating may comprise a capacitor in series with the circuit path through which said at least one coil is energised.

In a preferred embodiment, in which said means for generating a switched waveform comprises a full-wave bridge circuit having a controlled switch in each arm thereof, said at least one coil is connected across one diagonal of the bridge circuit across the other diagonal of which a source of energising current is connectable.

Preferably, said energising means comprises a full-wave switching bridge having a controlled switch in each arm of the bridge, said at least one coil being connected in series with a capacitor across one diagonal of the bridge across the other diagonal of which a source of energising current is connectable.

Preferably, said at least one coil comprises first and second axially-spaced coils between which a transducer region of the part is defined.

In a preferred embodiment, the first and second coils are connected in series to additively create an axially-directed magnetic field in said transducer region.

Preferably, said sensor arrangement comprises a sensor device oriented to detect a tangential or circumferentially-directed component of magnetic field.

Preferably, said sensor arrangement comprises a single sensor device acting at a single location for detection of a tangential or circumferentially-directed component of magnetic field.

Preferably, said sensor arrangement comprises a sensor device disposed externally to the body profile of the part.

Preferably, said sensor arrangement comprises a sensor device disposed in a notch, recess or bore in the part so as to be disposed substantially internally of the part.

Preferably, a sensor device is a single sensor device acting at a single location to detect a tangential or circumferentially-directed component of magnetic field.

Preferably, said at least one coil comprises a single coil and the sensor arrangement is disposed in close proximity to one end of the single coil and is oriented to be responsive to a tangential or circumferentially-directed component of magnetic field.

In a preferred embodiment described above, a method of measuring torque in a shaft or other part (collectively referred to as a "shaft") by means of a transducer comprises a shaft mounted for the application thereto of torque about a longitudinal axis of the shaft, at least a region of said shaft being of ferromagnetic material, a coil mounted about said region and energisable to induce an axially-directed magnetisation in said region, and a sensor arrangement comprising at least one sensor device mounted adjacent said coil and said region, said sensor device being oriented to detect a tangentially (circumferentially)-directed component of magnetic field external to said region, in which method the coil is energised by a series of energising pulses of current of alternating polarity which pulses have a relatively small duty cycle, the sensor arrangement produces sensor pulses of alternating polarity corresponding to said energising pulses, and the sensor pulses are measured in a peak-to-peak fashion to produce an output signal representing torque.

In another preferred method of measuring a force applied to an elongate member by means of a transducer comprising an elongate member mounted for the application thereto of a force causing the elongate member to tilt or skew angularly about a longitudinal axis thereof, the elongate member having at least a region of ferromagnetic material in which the tilt or skew is evinced, a coil mounted about said region and energisable to induce an axially-directed magnetisation in said region a sensor arrangement comprising at least one sensor device mounted adjacent said coil and said region, said sensor device being oriented to detect a tangentially (circumferentially)-directed component of magnetic field external to said region, the method comprises energising the coil by a series of energising pulses of current of alternating polarity which pulses have a relatively small duty cycle. The sensor arrangement produces sensor pulses of alternating polarity corresponding to said energising pulses, and the sensor pulses are measured in a peak-to-peak fashion to produce an, output signal representing torque.

Preferably, said coil and said at least one sensor device are comprised in a unitary transducer assembly.

Preferably, said energising pulses are generated by differentiating a switched waveform, for example a rectangular (including square) waveform.

Preferably, the switched waveform is applied to the at least one coil through a capacitor.

Preferably, the series of energising pulses is generated by a switching bridge circuit to an input diagonal of which a D.C. input is applied and to an output diagonal of which said at least one coil is connected to receive an A.C. waveform due to the switching of the bridge circuit.

Preferably, the circuit path through which said at least one coil is energised includes a series capacitor, and the series capacitor may be connected in series with said at least one coil to said output diagonal.

Preferably, the transducer assembly described above comprises a coil wound about an axis and having an axial hollow therethrough, said coil being energisable to generate an axially-directed magnetic field in a ferromagnetic portion of a shaft or other elongate member receivable in said hollow, energising means for energising said coil with alternating current to create an alternating polarity magnetic field in said part which field emanates a component dependent on torque in the part, said energising means being operable to generate a series of current pulses of alternating polarity in said coil, which pulses have a relatively small duty cycle, and a sensor arrangement comprising at least one sensor device disposed adjacent an end of said coil and said hollow for detecting a magnetic field component associated with a portion of ferromagnetic material received in said hollow, said sensor device being oriented to detect a magnetic field component in a tangential (circumferential) direction with respect to said axis, said sensor arrangement being operable to provide a series of torque-dependent signal pulses of alternating polarity corresponding to said series of current pulses, and signal processing means comprising a peak-to-peak detector responsive to said series of signal pulses to produce a torque-representing output signal dependent on the peak-to-peak value of said series of signal pulses.

Preferably, said energising means comprises means for generating a switched waveform, for example a rectangular (including square) waveform from a D.C. source and means for differentiating said waveform for application to said at least one coil.

Preferably, said means for differentiating comprises a capacitor in series with the circuit path through which said coil is energised.

Preferably, said means for generating a switched waveform comprises a full-wave bridge circuit having a controlled switch in each arm thereof, said coil being connected across one diagonal of the bridge circuit across the other diagonal of which a source of energising current is connectable.

Preferably, said energising means comprises a full-wave switching bridge having a controlled switch in each arm of the bridge, said coil being connected in series with a capacitor across one diagonal of the bridge across the other diagonal of which a source of energising current is connectable.

Preferably, said coil and said at least one sensor are a unitary assembly.

Preferably, said shaft is mounted for the application thereto of torque about a longitudinal axis of the shaft, at least a region of said shaft being of ferromagnetic material, the at least one coil is mounted about said region and energisable to induce an axially-directed magnetisation in said region; and the sensor arrangement comprises at least one sensor device mounted adjacent said coil and said region, said sensor device being oriented to detect a tangentially (circumferentially)-directed component of magnetic field external to said region.

Preferably, said shaft is mounted for the application thereto of torque about a longitudinal axis of the shaft, at least a region of said shaft being of ferromagnetic material, the at least one coil is mounted about said region and energisable to induce an axially-directed magnetisation in said region; and the sensor arrangement comprises at least one sensor device mounted adjacent said coil and said region, said sensor device being oriented to detect a tangentially (circumferentially)-directed component of magnetic field external to said region.

Preferably, said sensor arrangement comprises first and second sensor devices each having a respective axis of maximum sensitivity for detection of a magnetic field, said first and second sensor devices being arranged to have their respective axes of maximum sensitivity at an angle to one another for providing a combined axis of response which lies within, and preferably bisects, said angle.

Preferably, said sensor arrangement comprises first and second sensor devices each having a respective axis of maximum sensitivity for detection of a magnetic field, said first and second sensor devices being arranged to have their respective axes of maximum sensitivity at an angle to one another for providing a combined axis of response which lies within, and preferably bisects, said angle.

Preferably, said sensor arrangement comprises first and second sensor devices each having a respective axis of maximum sensitivity for detection of a magnetic field, said first and second sensor devices being arranged to have their respective axes of maximum sensitivity at an angle to one another for providing a combined axis of response which lies within, and preferably bisects, said angle.

Preferably, said at least one coil has a respective further coil axially to each side thereof and connected to be energised to produce a magnetic field of opposite polarity to that of said coil about the transducer region.

Preferably, said at least one coil has a respective further coil axially to each side thereof and connected to be energised to produce a magnetic field of opposite polarity to that of said coil about the transducer region.

Preferably, said at least one coil has a respective further coil axially to each side thereof and connected to be energised to produce a magnetic field of opposite polarity to that of said coil about the transducer region.

Preferably, said method further comprises disposing first and second further coils each wound about an axis coaxial with the first-mentioned coil and having an axial hollow therethrough in alignment along a common axis with the first-mentioned coil between and spaced from said first and second further coils to receive a ferromagnetic portion of a shaft or other elongate member to extend through all three coils.

Preferably, said apparatus further comprises first and second further coils each wound about an axis coaxial with the first-mentioned coil and having an axial hollow therethrough, the first mentioned coil and said first and second further coils being disposed in alignment along a common axis with the first-mentioned coil between and spaced from said first and second further coils to receive a ferromagnetic portion of a shaft or other elongate member to extend through all three coils.

Preferably, said transducer assembly further comprises first and second further coils each wound about an axis coaxial with the first-mentioned coil and having an axial hollow therethrough, the first mentioned coil and said first and second further coils being disposed in alignment along a common axis with the first-mentioned coil between and spaced from said first and second further coils to receive a ferromagnetic portion of a shaft or other elongate member to extend through all three coils.

Preferably, all three coils are connected in series such that said first and second further coils are energisable to generate magnetic fields of opposite polarity to that generated by the first-mentioned coil.

What is claimed is:

1. A transducer for measuring displacement comprising:
    a transducer assembly in which there is
    a coil wound about an axis and energisable to generate a magnetic field, and first and second magnetic field sensor devices, that are axially spaced with coil therebetween, each device being in proximity to the coil to respond to a magnetic field component generated by energisation of the coil;
    and a ferromagnetic member disposed to interact with the field generated by the coil,
    the ferromagnetic member and the transducer assembly being mounted for relative displacement in the direction of said axis, such that the balance of the respective field components sensed by the first and second sensor devices is a function of the axial position of the ferromagnetic member relative to the transducer assembly.

2. A transducer as claimed in claim 1 in which said axis is linear and said
    ferromagnetic member and said transducer assembly are mounted for a relative linear displacement.

3. A transducer as claimed in claim 1 in which a structure of ferromagnetic material is interposed between said member and said transducer assembly.

4. A transducer as claimed in claim 3 in which said structure is a tube, one of said transducer assembly and ferromagnetic member being mounted within the tube and the other being mounted exterior to the tube.

5. A transducer as claimed in claim 4 in which the ferromagnetic member is in the form of a ring and the member and the coil are disposed in proximity to the respective surface walls of the tube.

6. A transducer as claimed in claim 5 in which the ferromagnetic member and the transducer assembly are mounted exteriorly and interiorly of the tube respectively.

7. A transducer as claimed in claim 1 in which the ferromagnetic member is a part of or secured to move with a device whose displacement is to be measured.

8. A transducer as claimed in claim 1 further comprising an output circuit for developing a signal that is a function of relative displacement and to which said first and second sensor devices are connected in opposition so that the output signal represents the balance of the respective magnetic field components sensed thereby.

9. A transducer as claimed in claim 1 further comprising an A.C. source connected for energising said coil.

10. A transducer as claimed in claim 9 in which said A.C. source generates bipolar pulses of low duty cycle.

11. A transducer for measuring displacement comprising:
a transducer assembly in which there is
a first and a second coil each wound about an axis, the first and second coils being axially spaced and being interconnected for energisation such that the coils generate opposing fields in a region between the coils, and a magnetic field sensor device located in said region and responsive to the balance of the opposing fields generated therein;
and a ferromagnetic member disposed to interact with the magnetic fields generated in said region by the energised coils;
said ferromagnetic member and transducer assembly being mounted for relative displacement in the direction of said axis, such that the balance of opposing magnetic fields detected by said sensor device is a function of the axial position of the ferromagnetic member relative to the transducer assembly.

12. A transducer as claimed in claim 11 in which said axis is linear and said ferromagnetic member and said transducer assembly are mounted for a relative linear displacement.

13. A transducer as claimed in claim 11 in which a structure of ferromagnetic material is interposed between said member and said transducer assembly.

14. A transducer as claimed in claim 13 in which said structure is a tube, one of said transducer assembly and ferromagnetic member being mounted within the tube and the other being mounted exterior to the tube.

15. A transducer as claimed in claim 14 in which the ferromagnetic member is in the form of a ring and the member on the one hand and the first and second coils on the other hand are disposed in proximity to respective surface walls of the tube.

16. A transducer as claimed in claim 15 in which the ferromagnetic member and the transducer assembly are mounted exteriorly and interiorly of the tube respectively.

17. A transducer as claimed in claim 11 in which the ferromagnetic member is a part of or secured to move with a device whose displacement is to be measured.

18. A transducer as claimed in claim 11 further comprising an output circuit for developing a signal that is a function of relative displacement and to which said sensor device is connected so that the output signal represents the balance of the respective magnetic field components generated by the first and second coils.

19. A transducer as claimed in claim 11 further comprising an A.C. source connected for energising said coils.

20. A transducer as claimed in claim 19 in which said A.C. source generates bipolar pulses of low duty cycle.

21. A transducer as claimed in claim 19 in which said coils are connected in series to said source.

* * * * *